US009160237B2

(12) United States Patent
Itou et al.

(10) Patent No.: US 9,160,237 B2
(45) Date of Patent: Oct. 13, 2015

(54) ELECTRIC POWER CONVERTER

(71) Applicants: DENSO CORPORATION, Kariya, Aichi-pref. (JP); NIPPON SOKEN, INC., Nishio, Aichi-pref. (JP)

(72) Inventors: Hideki Itou, Toyokawa (JP); Yuuichi Handa, Anjo (JP); Yuji Hayashi, Kasugai (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 0 days.

(21) Appl. No.: 13/936,710

(22) Filed: Jul. 8, 2013

(65) Prior Publication Data
US 2014/0009971 A1  Jan. 9, 2014

(30) Foreign Application Priority Data

Jul. 9, 2012 (JP) ................................. 2012-153744

(51) Int. Cl.
*H02M 3/335* (2006.01)
*H02M 1/44* (2007.01)
(52) U.S. Cl.
CPC ............ *H02M 3/33507* (2013.01); *H02M 1/44* (2013.01); *H02M 3/33569* (2013.01)
(58) Field of Classification Search
CPC ..... H02M 3/00; H02M 3/28; H02M 3/33507; H02M 3/3376; H02M 3/33569; H02M 7/003
USPC .............................. 363/15, 17, 20, 21.01, 144
See application file for complete search history.

(56) References Cited

U.S. PATENT DOCUMENTS

| 3,895,285 | A | * | 7/1975 | Bardahl et al. | ................ | 363/141 |
| 5,804,952 | A | * | 9/1998 | Chen | .............................. | 323/255 |
| 5,946,210 | A | * | 8/1999 | Montminy et al. | ............. | 700/97 |
| 6,707,284 | B2 | * | 3/2004 | Lanni | ............................ | 323/297 |
| 7,187,568 | B2 | * | 3/2007 | Radosevich et al. | .......... | 363/144 |
| 7,379,312 | B2 | * | 5/2008 | Baptiste et al. | ................. | 363/59 |
| 7,800,921 | B2 | * | 9/2010 | Zhu et al. | ........................ | 363/17 |
| 7,839,668 | B2 | * | 11/2010 | Wong et al. | ................... | 363/144 |

(Continued)

FOREIGN PATENT DOCUMENTS

| JP | 9-182433 | 7/1997 |
| JP | 2009-254118 | 10/2009 |

(Continued)

OTHER PUBLICATIONS

Office Action (2 pages) dated Jul. 8, 2014, issued in corresponding Japanese Application No. 2012-153744 and English translation (2 pages).

*Primary Examiner* — Adolf Berhane
(74) *Attorney, Agent, or Firm* — Nixon & Vanderhye PC

(57) ABSTRACT

An electric power converter has a switching circuit section, a transformer, a rectifier, and a noise filtering element. The rectifier is connected to a secondary coil of the transformer. A closed circuit where the noise current flows is formed by the secondary coil, the rectifier, and the noise filtering element. The transformer and the noise filtering element are disposed in a position next to each other. The secondary coil and the noise filtering element are electrically connected to each other through a terminal for a coil that is a terminal of the secondary coil and a terminal for a filter that is a terminal of the noise filtering element. The terminal for the coil and the terminal for the filter are disposed in a position between the transformer and the noise filtering element.

4 Claims, 12 Drawing Sheets

(56) References Cited

U.S. PATENT DOCUMENTS

| | | | |
|---|---|---|---|
| 8,441,810 B2 * | 5/2013 | Telefus et al. | 363/17 |
| 8,766,561 B2 * | 7/2014 | Esaki et al. | 315/310 |
| 2013/0280956 A1 * | 10/2013 | Cheng et al. | 439/620.15 |

FOREIGN PATENT DOCUMENTS

| | | |
|---|---|---|
| JP | 2011-050126 | 3/2011 |
| JP | 2011-050160 | 3/2011 |

* cited by examiner

ELECTRIC POWER CONVERTER

CROSS-REFERENCE TO RELATED APPLICATION

This application is based on and claims the benefit of priority from earlier Japanese Patent Application No. 2012-153744 filed Jul. 9, 2012, the description of which is incorporated herein by reference.

TECHNICAL FIELD

The present disclosure relates to an electric power converter that has a transformer, a rectifier, and a noise filtering element.

BACKGROUND

A DC-DC converter as an electric power converter that has a transformer, a rectifier connected to a secondary coil of the transformer, a noise filtering element such as a capacitor, and a metal plate for mounting these components is known (refer to Japanese Patent Application Laid-Open Publication No. 9-182433, for example).

A switching circuit s connected to a primary coil of the transformer.

The electric power converter generates a pulse wave using the switching circuit, and transforms this pulse wave using the transformer.

Then, a secondary voltage of the transformer is rectified using the rectifier.

When the switching circuit is operated with high-frequency switching, noise currents are generated in the secondary coil.

The noise filtering element is provided in the electric power converter so that the noise currents do not get mixed with an output current.

That is, it is constituted that the noise currents that have occurred from the secondary coil and passed the rectifier are sent to the plate through the noise filtering element, and are further sent to other electronic components to have the noise currents returned to the secondary coil.

Thus, the noise currents that are getting mixed with the output current of the electric power converter are suppressed by returning the noise currents to a source.

However, since a path where the noise currents flow is long in the conventional electric power converter, radiation noise from the path is easily generated when the noise currents flow.

For this reason, there is a possibility that the radiation noise leaks outside the electric power converter, or the radiation noise acts on other electronic components in the electric power converter and newly generates other noise currents.

Therefore, the electric power converter that is more excellent in a performance (noise filtering property) of shielding the radiation noise and the noise currents is desired.

SUMMARY

An embodiment provides an electric power converter that has an outstanding noise filtering property.

In an electric power converter according to a first aspect, the electric power converter has a switching circuit section that is composed of switching elements, a transformer that has a primary coil connected to the switching circuit section and a secondary coil, a rectifier connected to the secondary coil of the transformer, and a noise filtering element that allows a specific noise current to pass.

A closed circuit where the noise current flows is formed by the secondary coil, the rectifier, and the noise filtering element.

The transformer and the noise filtering element are disposed in a position next to each other.

The secondary coil and the noise filtering element are electrically connected to each other through a terminal for a coil that is a terminal of the secondary coil and a terminal for a filter that is a terminal of the noise filtering element.

The terminal for the coil and the terminal for the filter are disposed in a position between the transformer and the noise filtering element.

In the electric power converter, the closed circuit where the noise current flows is formed by the secondary coil, the rectifier, and the noise filtering element.

That is, current paths are formed in the closed circuit where the noise currents generated in the secondary coils flow. The noise currents pass the rectifiers and return to the secondary coils through the noise filtering element in the current paths.

In addition, while disposing the transformer and the noise filtering element in the position next to each other, the terminal for the coil and the terminal for the filter are disposed between the transformer and the noise filtering element.

Therefore, the current path between the secondary coil and the noise filtering element built in the transformer can be shortened.

Thereby, it becomes possible to shorten the length of the closed circuit where the noise current flows.

Therefore, an amount of generation of a radiation noise can be reduced.

Furthermore, while the amount of the radiation noise emitted outside from the electric power converter can be reduced, the radiation noise that acts on other electronic components in the electric power converter can be suppressed form being newly generated and getting mixed into the output.

According to the present disclosure, the electric power converter that has an outstanding noise filtering property can be provided.

In the electric power converter according to a second aspect, the terminal for the coil and the terminal for the filter are connected directly.

In the electric power converter according to a third aspect, there is provided a metal plate for mounting the switching circuit section, the transformer, the rectifier, and the noise filtering element.

The plate is grounded, and the terminal for the coil and the terminal for the filter are overlapped and fastened together on the plate.

In the electric power converter according to a fourth aspect, there is provided a metal plate for mounting the switching circuit section, the transformer, the rectifier, and the noise filtering element, and the terminal for the coil and the terminal for the filter are connected to different positions on the plate, respectively.

In the electric power converter according to a fifth aspect, the rectifier and the noise filtering element are built in a single module.

In the electric power converter according to a sixth aspect, the module includes a main element body that has the rectifier and the noise filtering element therein, a terminal for rectification for connecting the rectifier to the secondary coil, and a terminal for a filter.

The terminal for rectification and the terminal for the filter are respectively projected towards the secondary coil from the main element body.

DETAILED DESCRIPTION OF THE PREFERRED EMBODIMENTS

Embodiments

First Embodiment

With reference to FIG. 1 to FIG. 6, hereinafter will be described a first embodiment of the present disclosure.

Figure 2:
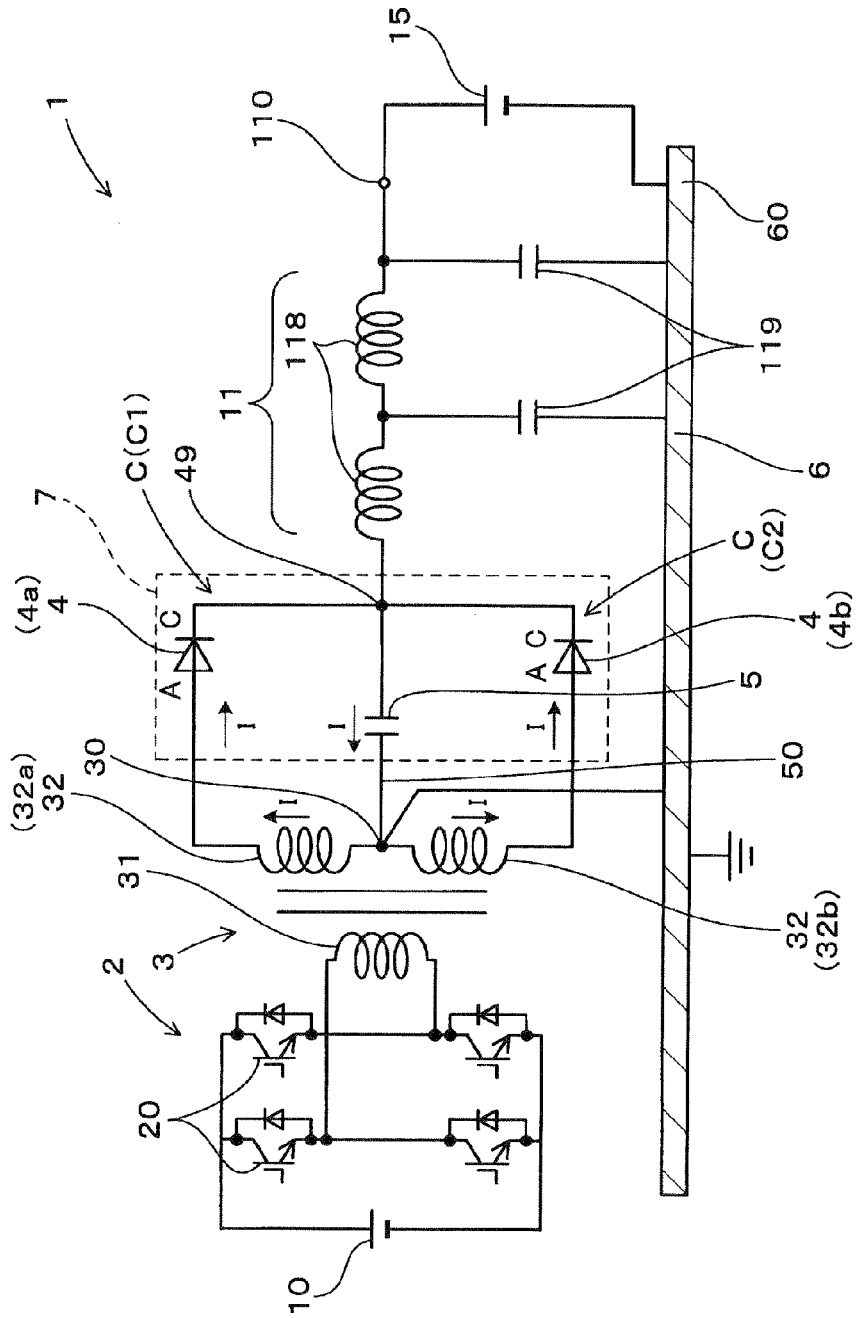
FIG. 2 shows a circuit diagram of the electric power converter in the first embodiment.

As shown in FIG. 2, an electric power converter 1 of the present embodiment has a switching circuit section 2, a transformer 3, rectifiers 4, and a noise filtering element 5.

The switching circuit section 2 is composed of a plurality of switching elements 20.

The transformer 3 has a primary coil 31 and secondary coils 32.

The primary coil 31 is connected to the switching circuit section 2.

The rectifiers 4, such as diodes, for example, are connected to the secondary coils 32 of the transformer 3.

The noise filtering element 5 is a capacitor.

The noise filtering element 5 allows specific noise currents I to pass.

A closed circuit C where the noise currents I flow is formed by the secondary coils 32, the rectifiers 4, and the noise filtering element 5.

Figure 1:
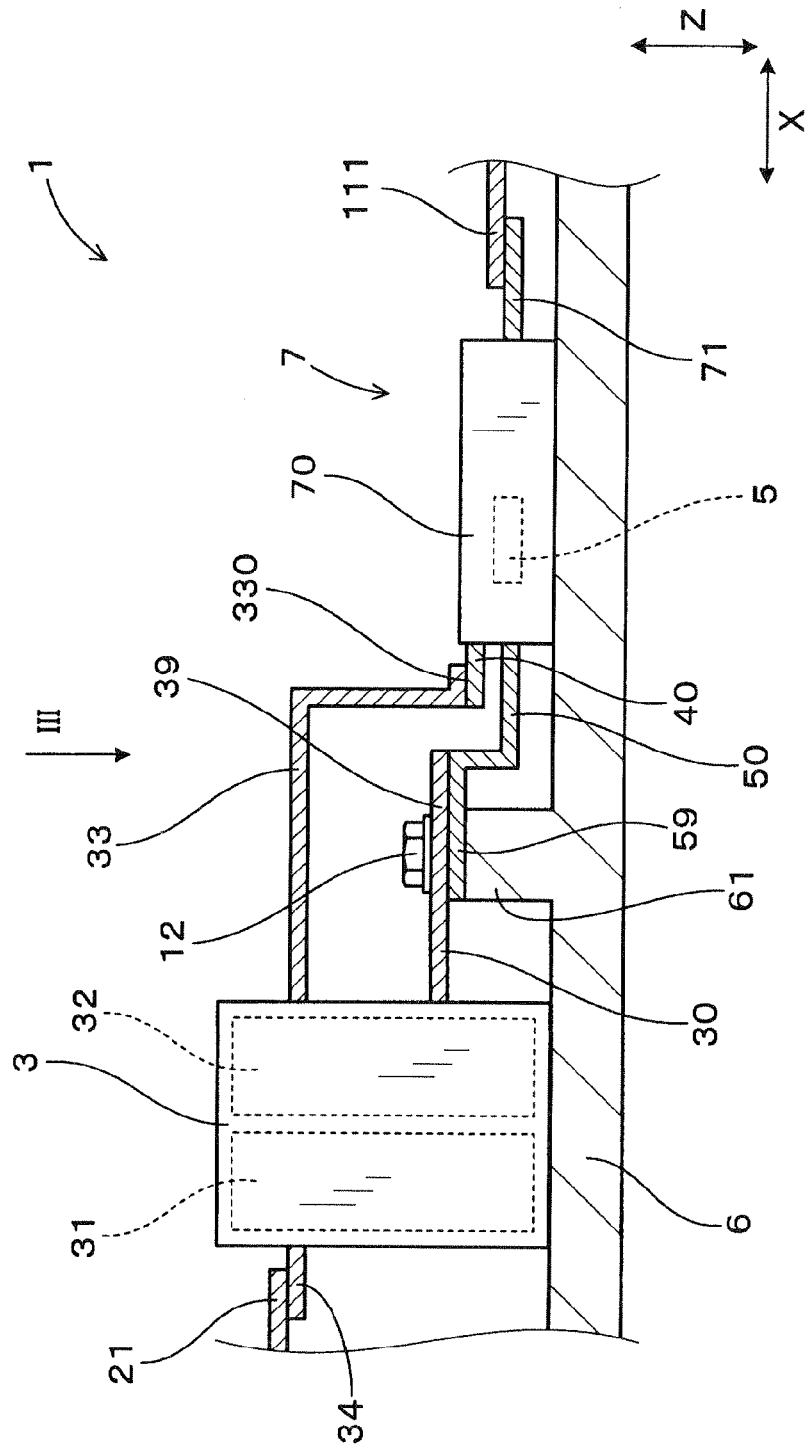
FIG. 1 shows an enlarged sectional view of a principal part of an electric power converter in a first embodiment.
Figure 3:
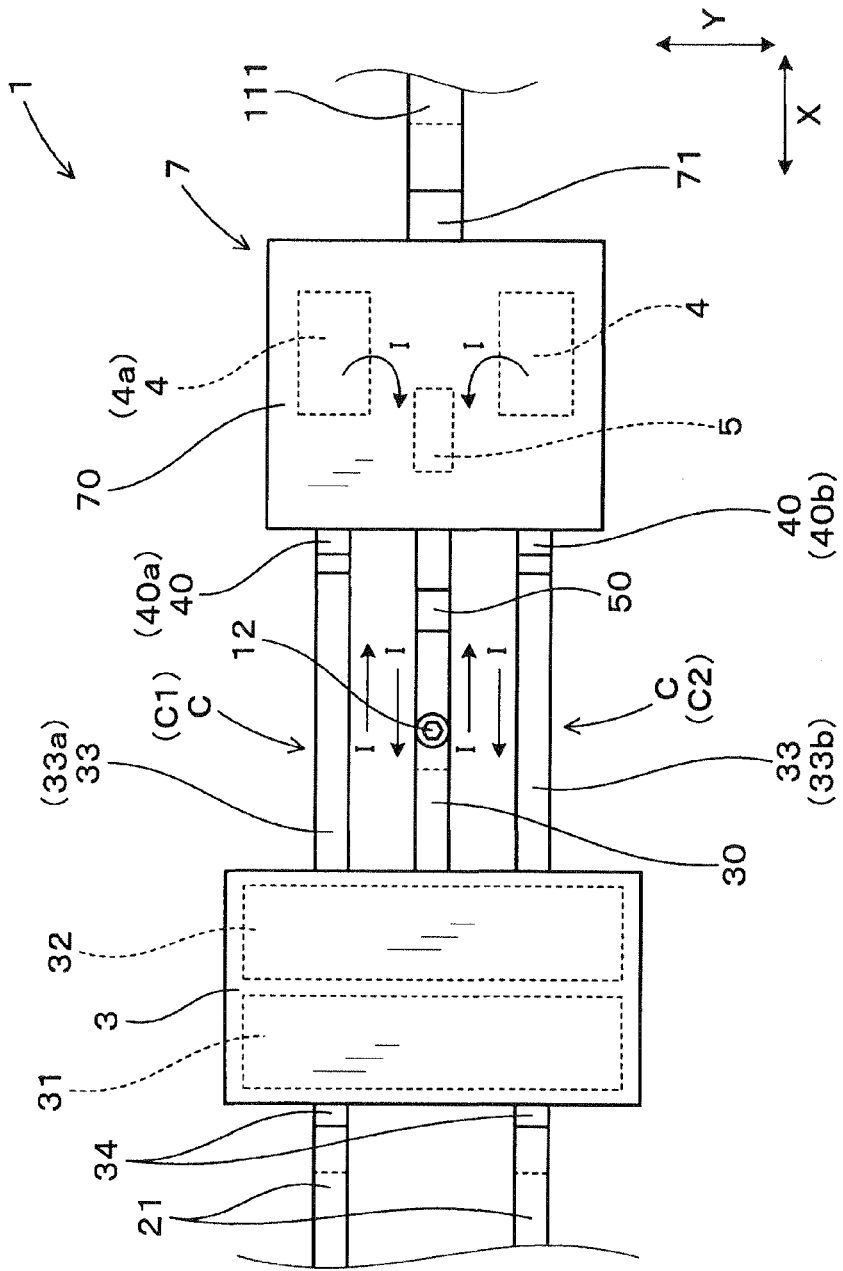
FIG. 3 shows a view taken in a direction of an arrow III of FIG. 1.

As shown in FIG. 1 and FIG. 3, the transformer 3 and the noise filtering element 5 are disposed in a position next to each other.

The secondary coils 32 and the noise filtering element 5 are electrically connected to each other through a terminal 30 for the coils that is a terminal of the secondary coils 32 and a terminal 50 for a filter that is a terminal of the noise filtering element 5.

The terminal 30 for the coils and the terminal 50 for the filter are disposed in a position between the transformer 3 and the noise filtering element 5.

The electric power converter 1 of the present embodiment is a DC-DC converter installed in a vehicle.

As shown in FIG. 2, the switching circuit section 2 is connected to a first direct-current (DC) power supply 10.

The electric power converter 1 converts a direct voltage of the first DC power supply 10 into a pulse voltage using the switching circuit section 2, and transforms the direct voltage using the transformer 3.

Then, a secondary voltage of the secondary coils 32 is rectified using the rectifiers 4, and smoothened using a smoothening filter circuit section 11.

It is constituted to charge a second DC power supply 15 using the smoothened direct voltage.

The first DC power supply 10 is a high-voltage battery for hybrid cars, for example, and the second DC power supply 10 is a low-voltage battery such as a lead-acid battery, for example.

Moreover, the electric power converter 1 has a metal plate 6.

The switching circuit section 2, the transformer 3, the rectification circuit 4, the noise filtering element 5, and the smoothening circuit section 11 are mounted on the plate 6.

The plate 6 is grounded.

The transformer 3 has the two secondary coils 32, namely a first secondary coil 32a and a second secondary coil 32b, as shown in FIG. 2.

The terminal 30 for the coils is disposed at a connection point of the two secondary coils 32.

The terminal 30 for the coils is a center tap of the transformer 3, and is grounded through the plate 6.

Moreover, the secondary coils 32 are composed of a bus bar.

The secondary coils 32 and the terminal 30 for the coils are constituted by a single sheet of the bus bar.

That is, the secondary coils 32 and the terminal 30 for the coils are formed unitarily.

The electric power converter 1 of the present embodiment has the two rectifiers 4, namely a first rectifier 4a and a second rectifier 4b.

An anode A of the first rectifier 4a among the two rectifiers 4 is connected to the first secondary coil 32a.

Moreover, an anode A of the second rectifier 4b is connected to the second secondary coil 32b.

Cathodes of the two rectifiers 4a and 4b are connected to each other.

As shown in FIG. 2, between a connection point 49 of the cathodes C of the rectifiers 4a and 4b and the terminal 30 for the coils is connected by the noise filtering element 5.

A first closed circuit C1 is formed by the first secondary coil 32a, the first rectifier 4a, and the noise filtering element 5.

Moreover, a second closed circuit C2 is formed by the second secondary coil 32b, the second rectifier 4b, and the noise filtering element 5.

Moreover, the smoothening filter circuit section 11 is connected to the connection point 49.

The smoothening filter circuit section 11 is composed of a plurality of coils 118 and a plurality of capacitors 119.

The capacitors 119 are connected to the plate 6.

Moreover, the second DC power supply 15 is connected to an end 110 of the smoothening filter circuit section 11 and an end 60 of the plate 6.

When the switching circuit section 2 is operated with high-frequency switching, a noise voltage is generated in the secondary coils 32.

Figure 13:
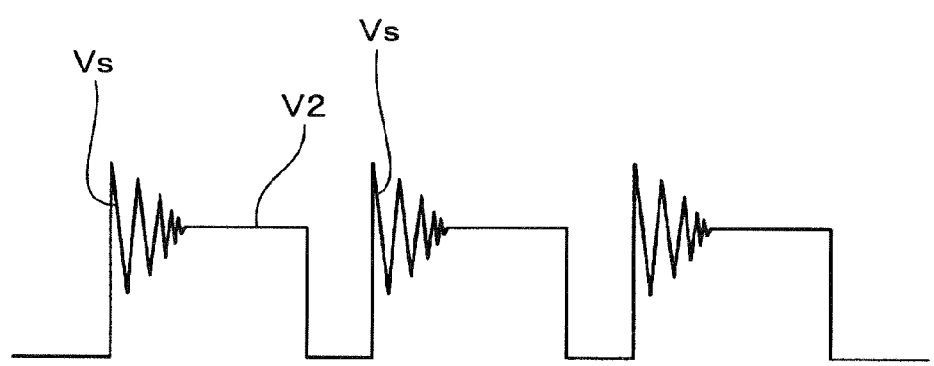
FIG. 13 shows a voltage waveform after rectification of a secondary coil in a comparative example.

Supposing that the noise filtering element 5 is not provided, as shown in FIG. 13, a surge voltage Vs is generated at a start of the secondary voltage V2.

Moreover, a ringing arises for a while after the start.

These surge voltage Vs and the ringing cause the noise voltage.

Moreover, the noise currents I arise accompanying with the generating of the noise voltage.

In the present embodiment, as shown in FIG. 2, the noise currents I occurring from the secondary coils 32 flow through the rectifiers 4.

The noise currents I then return to the secondary coils 32 after passing along the noise filtering element 5.

Thus, the noise currents I flowing into the smoothening filter circuit section 11 is suppressed by returning the noise currents I to a source.

Figure 4:
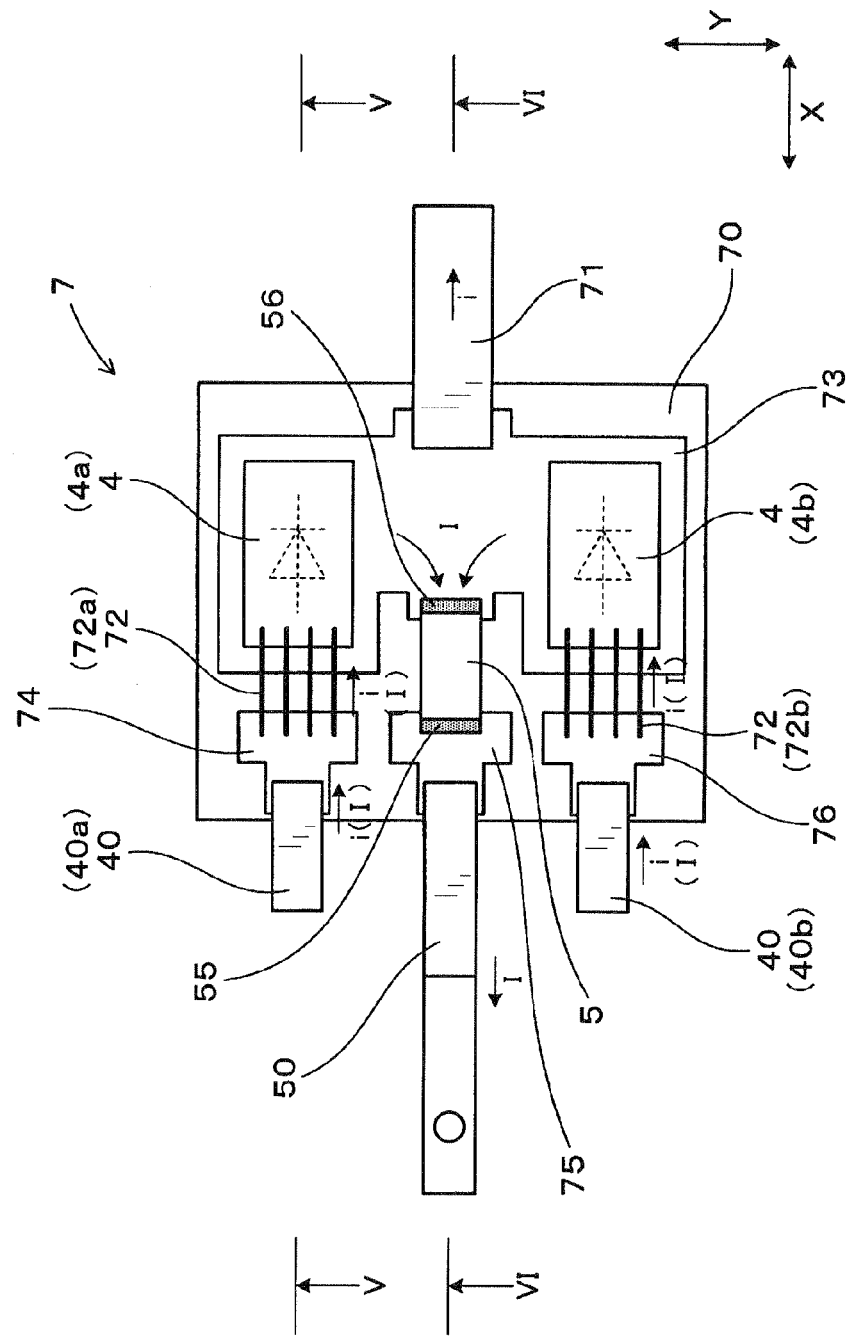
FIG. 4 shows a partial transparent plan view of a module in the first embodiment.

As shown in FIG. 4, in the present embodiment, the two rectifiers 4a and 4b and the noise filtering element 5 are built in a single module 7.

The module 7 has the terminal 50 for the filter, and the two terminals 40 for rectification, namely a first terminal 40a for rectification and a second terminal 40b for rectification for connecting the rectifiers 4 to the secondary coils 32.

The terminal 50 for the filter and the terminals 40a and 40b for rectification are respectively projected towards the transformer 3 (refer to FIG. 3).

A boss 61 is formed on the plate 6 as shown in FIG. 1.

The terminal 50 for the filter is projected towards the transformer 3 from the module 7, and is bent in two places.

Then, a tip 59 of the terminal 50 for the filter is placed on a top of the boss 61.

Moreover, the terminal 30 for the coils is projected towards the module 7 from the transformer 3.

Then, a tip 39 of the terminal 30 for the coils is overlapped on the tip 59 of the terminal 50 for the filter, and the tips 39 and 59 are fixed to the boss 61 using a screw 12.

As shown in FIG. 3, the terminal 30 for the coils and the terminal 50 for the filter are positioned between the transformer 3 and the noise filtering element 5 when seen from a thickness direction of the plate 6 (Z direction in FIG. 1).

Moreover, the transformer 3 has two rectifier connecting terminals 33, namely, a first rectifier connecting terminal 33a and a second rectifier connecting terminal 33b.

The rectifier connecting terminals 33 are provided for connecting the secondary coils 32 to the rectifiers 4.

The first terminal 40a for rectification is connected to the first rectifier connecting terminal 33a, and the second terminal 40b for rectification is connected to the second rectifier connecting terminal 33b.

The two rectifier connecting terminals 33a and 33b are parallel to each other, and each projects in a projection direction of the terminal 30 for the coils (X direction in FIG. 3).

As shown in FIG. 1, the rectifier connecting terminals 33 are bent in two places and tips 330 thereof are overlapped on top of the terminal 40 for rectification of the module 7.

The tips 330 and the terminal 40 for rectification are connected by welding, soldering, etc.

Moreover, the transformer 3 has circuit connecting terminals 34 for connecting the primary coil 31 to the switching circuit section 2.

The circuit connecting terminals 34 are projected in the X direction to a side opposite to a side where the terminal 30 for the coils are projected.

Terminals 21 of the switching circuit section 2 are connected to the circuit connecting terminals 34.

Moreover, the module 7 has an output terminal 71.

The output terminal 71 is projected from a main element body 70 of the module 7 in the X direction to a side opposite to a side where the terminal 50 for the filter is projected.

A terminal 111 of the smoothening filter circuit section 11 is connected to the output terminal 71.

The module 7 has the two rectifiers 4a and 4b, the noise filtering element 5, a main metal plate 73, two sheets of metal plates 74 and 76 for connecting rectifiers, and a metal plate 75 for the filter as shown in FIG. 4.

These components are built in the main element body 70.

Moreover, the terminals 40 for rectification mentioned above, the terminal 50 for the filter, and the output terminal 71 are partially embedded in the main element body 70.

Figure 5:
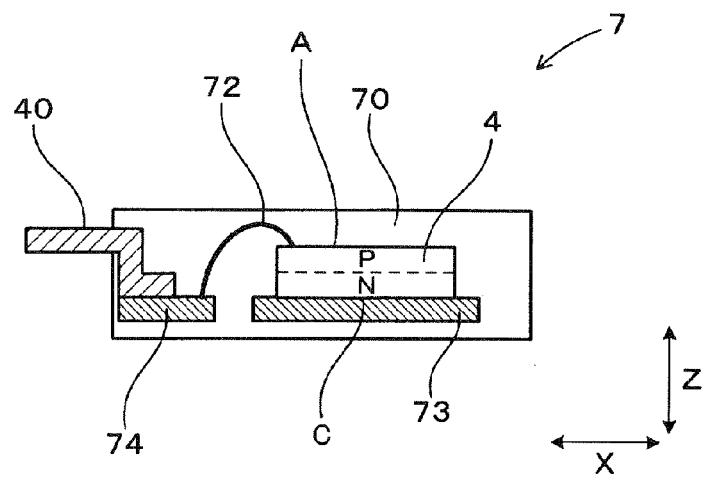
FIG. 5 shows a sectional view taken along a line V-V of FIG. 4.

As shown in FIG. 4 and FIG. 5, the rectifiers 4 are mounted on the main metal plate 73.

Each cathode C of the rectifiers 4 is electrically connected to the main metal plate 73.

Moreover, each anode A of the rectifiers 4 are connected to the metal plates 74 and 76 for connecting rectifiers by wires 72.

The terminals 40 for rectification are connected to the metal plates 74 and 76 for connecting rectifiers.

Figure 6:
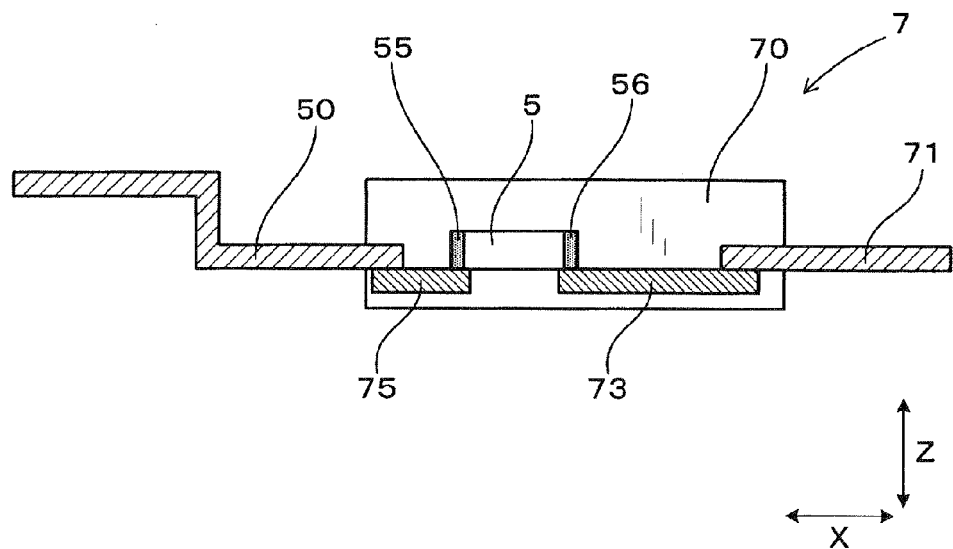
FIG. 6 shows a sectional view taken along a line VI-VI of FIG. 4.

As shown in FIG. 4 and FIG. 6, the noise filtering element is disposed so as to bridge between the main metal plate 73 and the metal plate 75 for the filter.

The noise filtering element 5 has a cuboid shape, and electrodes 55 and 56 are disposed in both ends in the X direction.

One of the electrodes 55 is connected to the metal plate 75 for the filter, and another one of the electrode 56 is connected to the main metal plate 73.

The terminal 50 for the filter is connected to the metal plate 75 for the filter.

As shown in FIG. 4, the noise filtering element 5 is disposed between the wires 72a in the first rectifier 4a side and the wires 72b in the second rectifier 4a side in a direction (Y direction in FIG. 4) that intersects perpendicularly with both the X direction and the Z direction.

Moreover, the output terminal 71 is connected to the main metal plate 73.

Secondary currents i generated in the secondary coils 32 (refer to FIG. 2) pass along the terminals 40 for rectification and the wires 72, then flow through the rectifiers 4a and move to the main metal plate 73.

Then, direct-current components included in the secondary currents i flow into the smoothening filter part 11 through the output terminal 71.

The noise currents I (alternating-current components) included in the secondary currents i pass along the noise filtering element 5, and return to the secondary coils 32.

Next, functions and effects of the present embodiment are explained.

In the present embodiment, as shown in FIG. 1 and FIG. 3, the closed circuit C where the noise currents I flow is formed by the secondary coils 32, the rectifiers 4, and the noise filtering element 5.

That is, current paths are formed in the closed circuit C where the noise currents I generated in the secondary coils 32 flow. The noise currents I pass the rectifiers 4 and return to the secondary coils 32 through the noise filtering element 5 in the current paths.

In addition, while disposing the transformer 3 and the noise filtering element 5 in the position next to each other, the terminal 30 for the coils and the terminal 50 for the filter are disposed in the position between the transformer 3 and the noise filtering element 5.

Therefore, the current path between the secondary coils 32 and the noise filtering element 5 built in the transformer 3 can be shortened.

Thereby, it becomes possible to shorten the length of the closed circuit C where the noise currents I flow.

Therefore, an amount of generation of a radiation noise can be reduced.

Furthermore, while the amount of the radiation noise emitted outside from the electric power converter 1 can be reduced, the radiation noise that acts on other electronic components (the coils 118, the capacitors 119 in FIG. 2, for example) in the electric power converter 1 can be suppressed form being newly generated and getting mixed into the output.

Moreover, if the length of the closed circuit C is shortened, floating inductance of the closed circuit C can be made small.

As mentioned above, the noises are mainly originated in the surge voltage Vs (refer to FIG. 13) of the secondary coils 32.

If the floating inductance of the closed circuit C is made small, the noise (surge voltage Vs) is easily conducted in the closed circuit C, and is easily returned to the secondary coils 32.

Therefore, it becomes easy to suppress the surge voltage Vs.

Moreover, since the amount of the radiation noise that is generated from the closed circuit C can be reduced in the present embodiment as mentioned above, it becomes possible to dispose precision components, such as a microcomputer that is easy to get influenced of by the radiation noise near the closed circuit C.

Moreover, as shown in FIG. 1 and FIG. 3, the terminal 30 for the coils and the terminal 50 for the filter are connected directly in the present embodiment.

Therefore, the length of the path where the noise currents I flow between the secondary coils 32 and the noise filtering element 5 can be shortened more, and generating of the radiation noise can be suppressed.

Thereby, it becomes possible to raise a noise filtering property of the electric power converter 1 more.

Moreover, as shown in FIG. 2, the plate 6 is grounded in the present embodiment.

Further, as shown in FIG. 1, the terminal 30 for the coils and the terminal 50 for the filter are overlapped and fastened together on the plate 6.

Thereby, the secondary coils 32 can be grounded using the terminal 30 for the coils.

Therefore, it becomes unnecessary to provide a terminal used exclusively for grounding the secondary coils 32.

Moreover, as shown in FIG. 4, the rectifier 4 and the noise filtering element 5 are built in the single module 7 in the present embodiment.

Therefore, the number of the components can be reduced.

Therefore, in a manufacturing process of the electric power converter 1, it becomes easy to work on mounting the rectifiers 4 and the noise filtering element 5, or connecting them to other components.

Moreover, as shown in FIG. 3, the terminal 40 for rectification and the terminal 50 for the filter are projected from the main element body 70 towards the secondary coil 32 side in the present embodiment.

Therefore, the length of the path where the noise currents I flow between the secondary coils 32 and the noise filtering element 5 can be shortened and the length of the where the noise currents I flow between the rectifiers 4 and the secondary coils 32 can also be shortened.

Thereby, the length of the closed circuit C can be shortened more and it becomes possible to reduce the amount of generation of the radiation noise more.

Therefore, the noise filtering property of the electric power converter 1 can be improved more.

According to present embodiment, as mentioned above, the electric power converter having the more outstanding noise filtering property can be offered.

In addition, although the diodes are used as the rectifiers 4 in the present embodiment, switching elements such as an IGBT element or MOSFET may be used instead.

That is, a synchronous rectification circuit may be constituted using these switching elements.

Moreover, although the capacitor is used as the noise filtering element 5 in the present embodiment, other electronic components are also employable.

For example, a capacitor and resistance connected in series or in parallel can be used.

Moreover, a capacitor and a coil may be connected in series or in parallel.

In this case, a noise component equivalent to the resonance frequency of the capacitor and the coil can be passed especially effectively.

Second Embodiment

It should be appreciated that, in the second embodiment and the subsequent embodiments, components identical with or similar to those in the first embodiment are given the same reference numerals unless otherwise mentioned, and structures and features thereof will not be described in order to avoid redundant explanation.

The present embodiment (i.e., the second embodiment) is an example that has changed the shapes of the terminal 30 for the coils and the terminal 50 for the filter.

Figure 7:
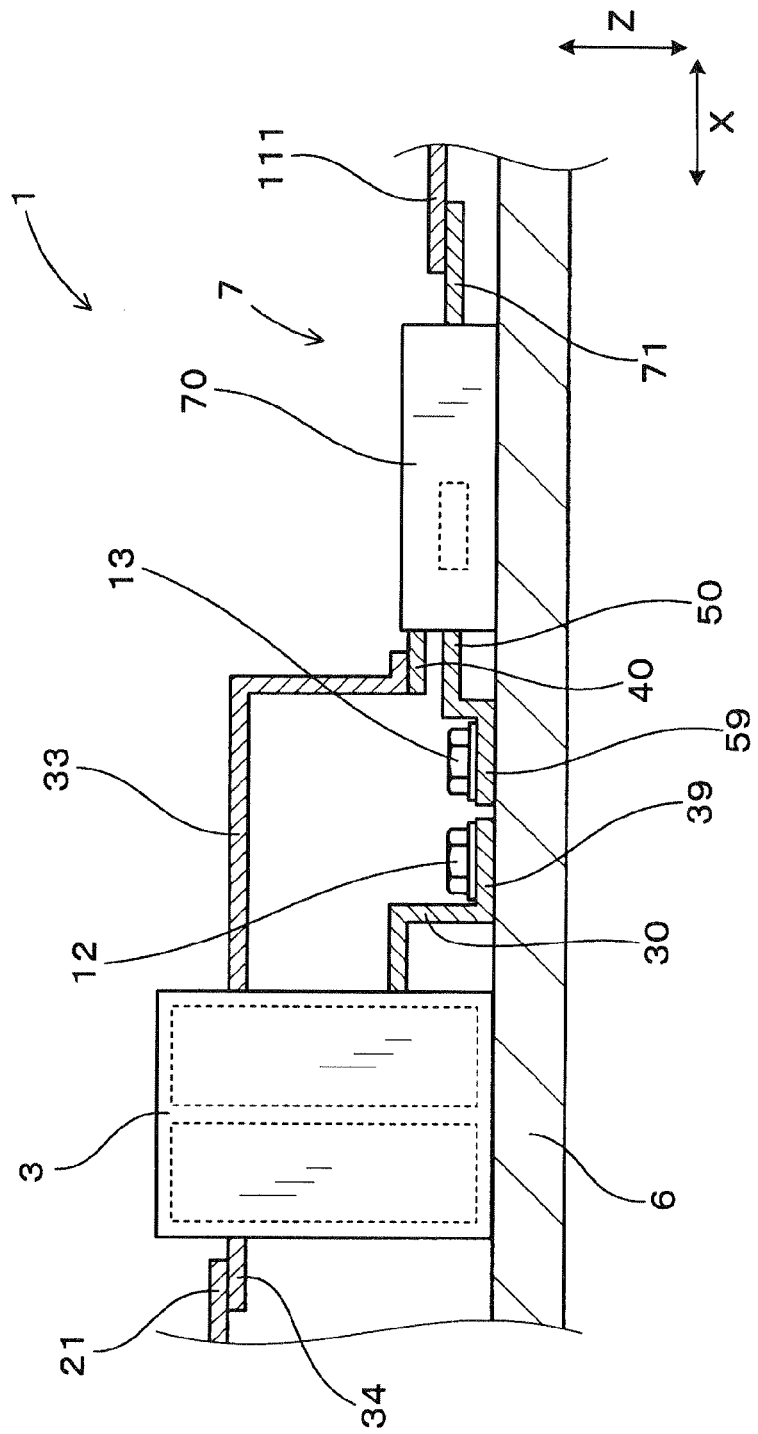
FIG. 7 shows an enlarged sectional view of a principal part of an electric power converter in a second embodiment.
Figure 8:
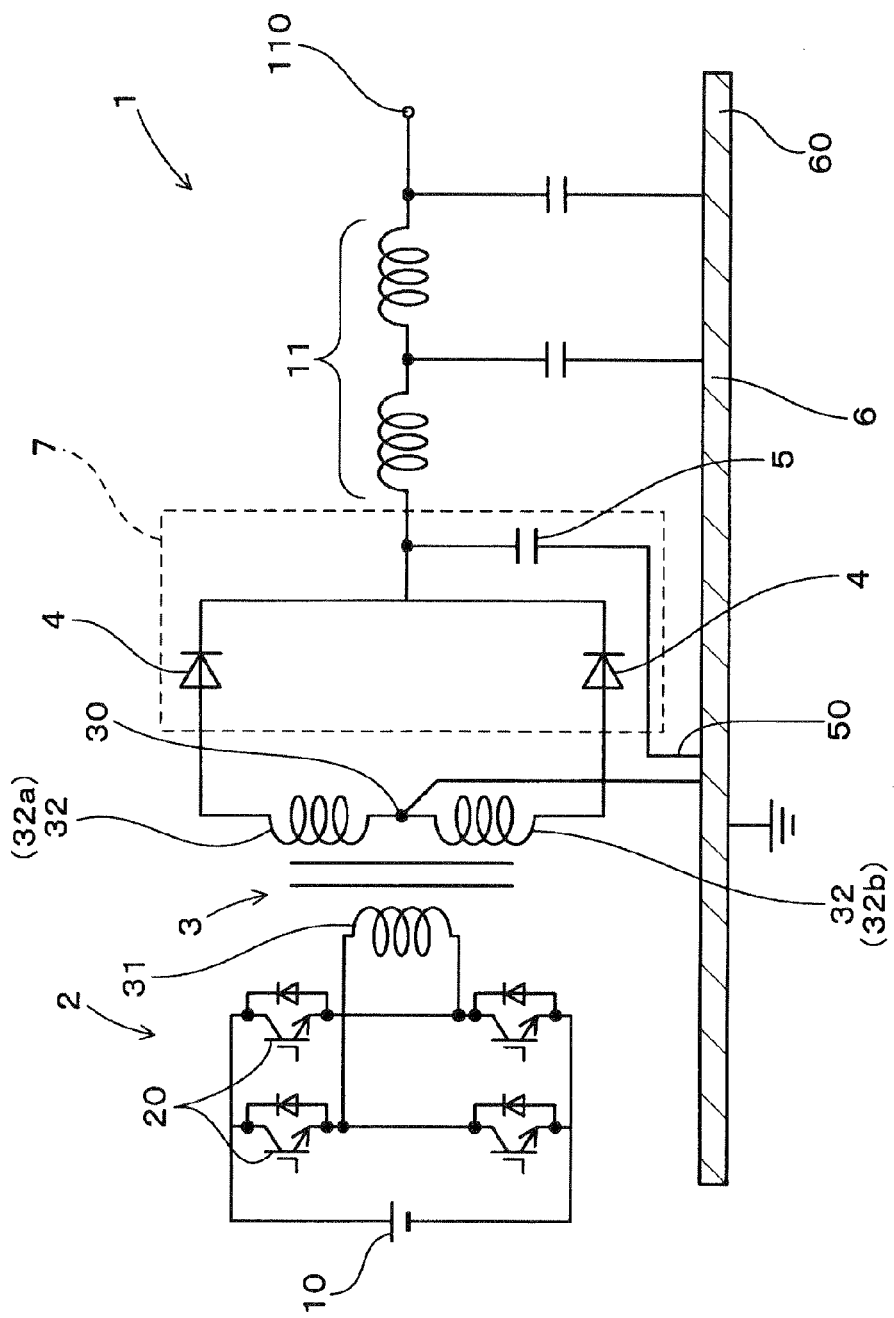
FIG. 8 shows a circuit diagram of the electric power converter in the second embodiment.

As shown in FIG. 7 and FIG. 8, the terminal 30 for the coils and the terminal 50 for the filter are connected to different positions on the plate 6, respectively, in the present embodiment.

As shown in FIG. 7, the terminal 30 for the coils is projected towards the module 7 from the transformer 3.

The terminal 30 for the coils is bent in two places and the tip 39 contacts the surface of the plate 6.

Then, the tip 39 is fixed to the plate 6 using a first screw 12.

Moreover, the terminal 50 for the filter is projected towards the transformer 3 from the main element body 70.

The terminal 50 for the filter is bent in two places and the tip 59 contacts the surface of the plate 6.

Then, the tip 59 is fixed to the plate 6 using a second screw 13.

The tip 59 of the terminal 50 for the filter is positioned in the main element body 70 side rather than the tip 39 of the terminal 30 for the coils.

In this composition, design flexibility, such as a shape or length of the terminal 30 for the coils and the terminal 50 for the filter, can be raised.

Moreover, the length of the terminal 30 for the coils or the terminal 50 for the filter can be shortened, and the manufacturing cost of the transformer 3 or the module 7 can be reduced.

The rest of the composition, functions and effects are the same as those of the first embodiment.

Third Embodiment

The present embodiment is an example that has changed the composition of the noise filtering element 5.

Figure 9:
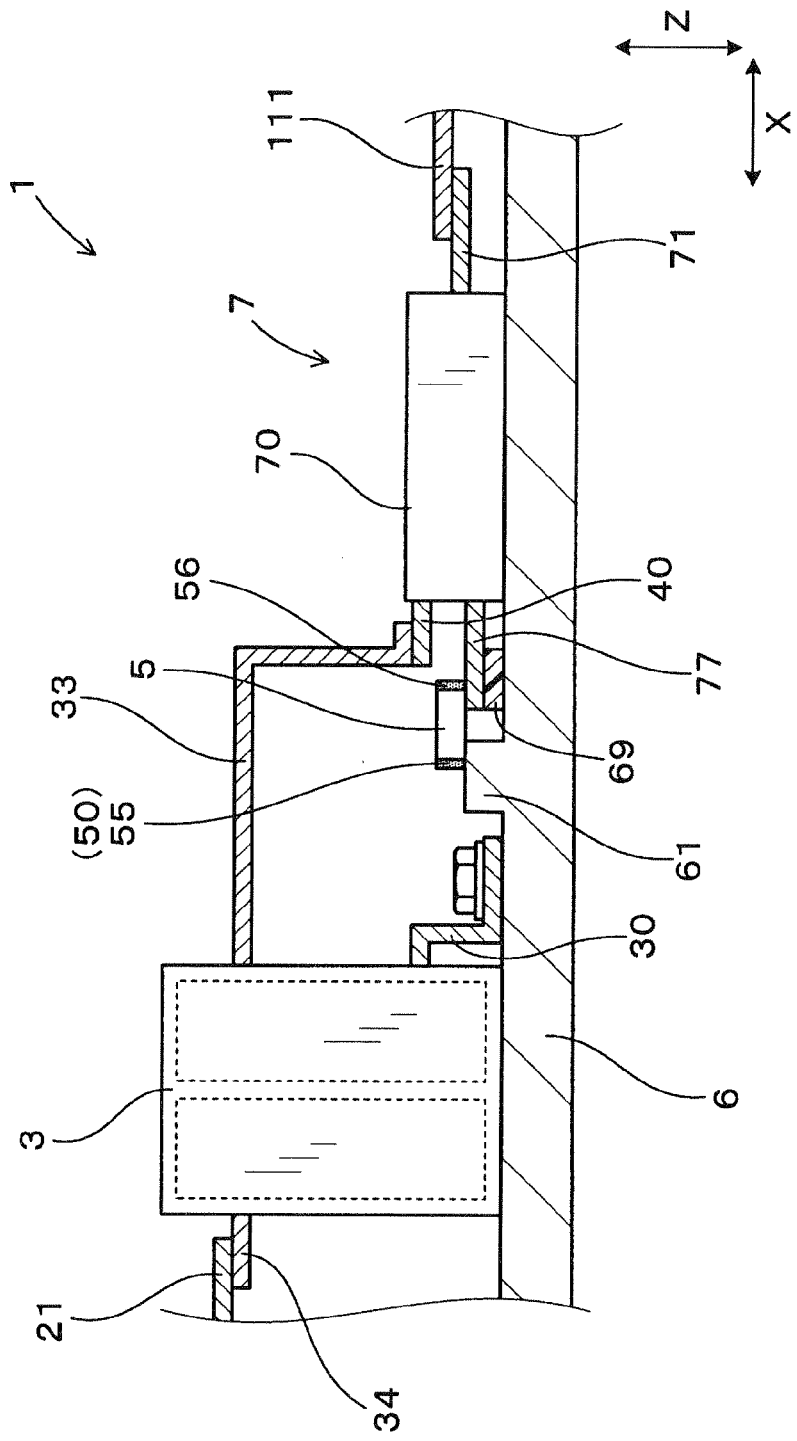
FIG. 9 shows an enlarged sectional view of a principal part of an electric power converter in a third embodiment.
Figure 10:
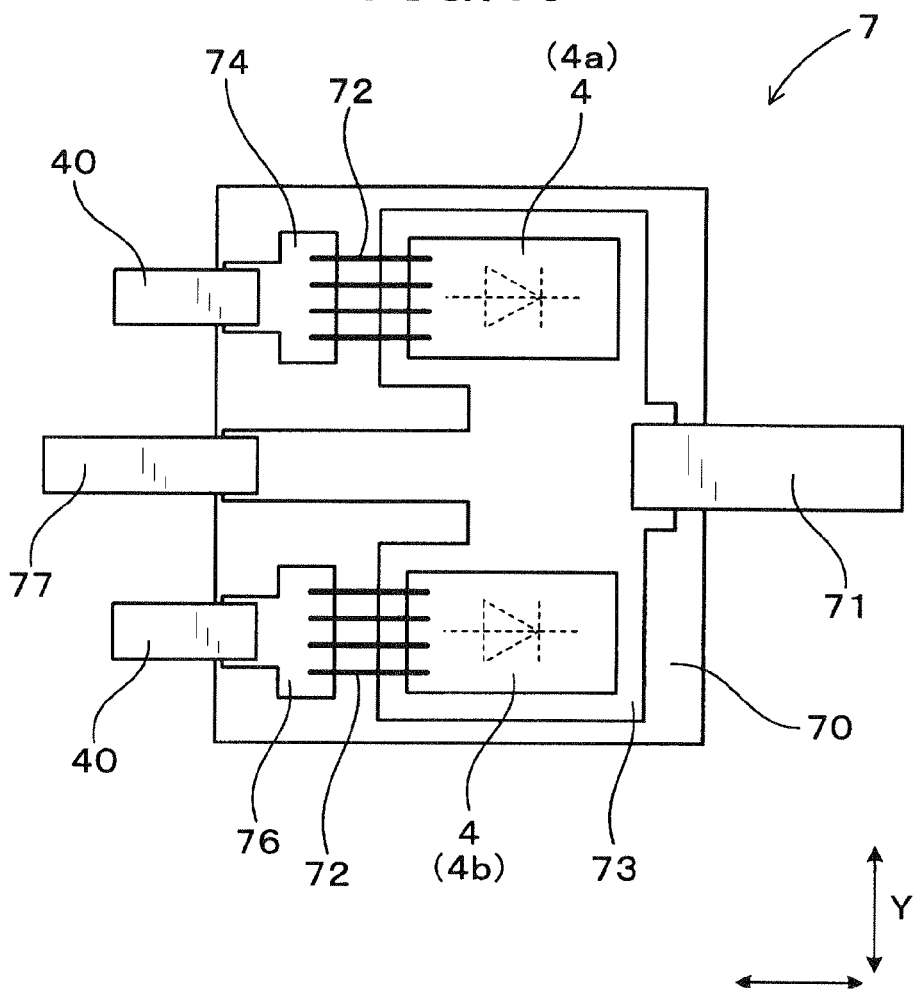
FIG. 10 shows a partial transparent plan view of a module in the third embodiment.

As shown in FIG. 9 and FIG. 10, in the present embodiment, the noise filtering element 5 is not embedded in the module 7, but the module 7 and the noise filtering element 5 are separated components.

The boss 61 is formed in the plate 6 like the first embodiment.

One of the electrodes 55 of the noise filtering element 5 is connected to this boss 61.

This electrode 55 serves as the terminal 50 for the filters (refer to FIG. 1) in the present embodiment.

Moreover, another one of the electrode 56 of the noise filtering element 5 is connected to a connecting terminal 77 of the module 7.

An insulating member 69 intervenes between the connecting terminal 77 and the plate 6.

The connecting terminal 77 is connected to the main metal plate 73 inside the module 7, as shown in FIG. 10.

The rest of the composition, functions and effects are the same as those of the first embodiment.

Fourth Embodiment

The present embodiment is an example that has changed the number of the secondary coils 32 and the rectifiers 4.

Figure 11:
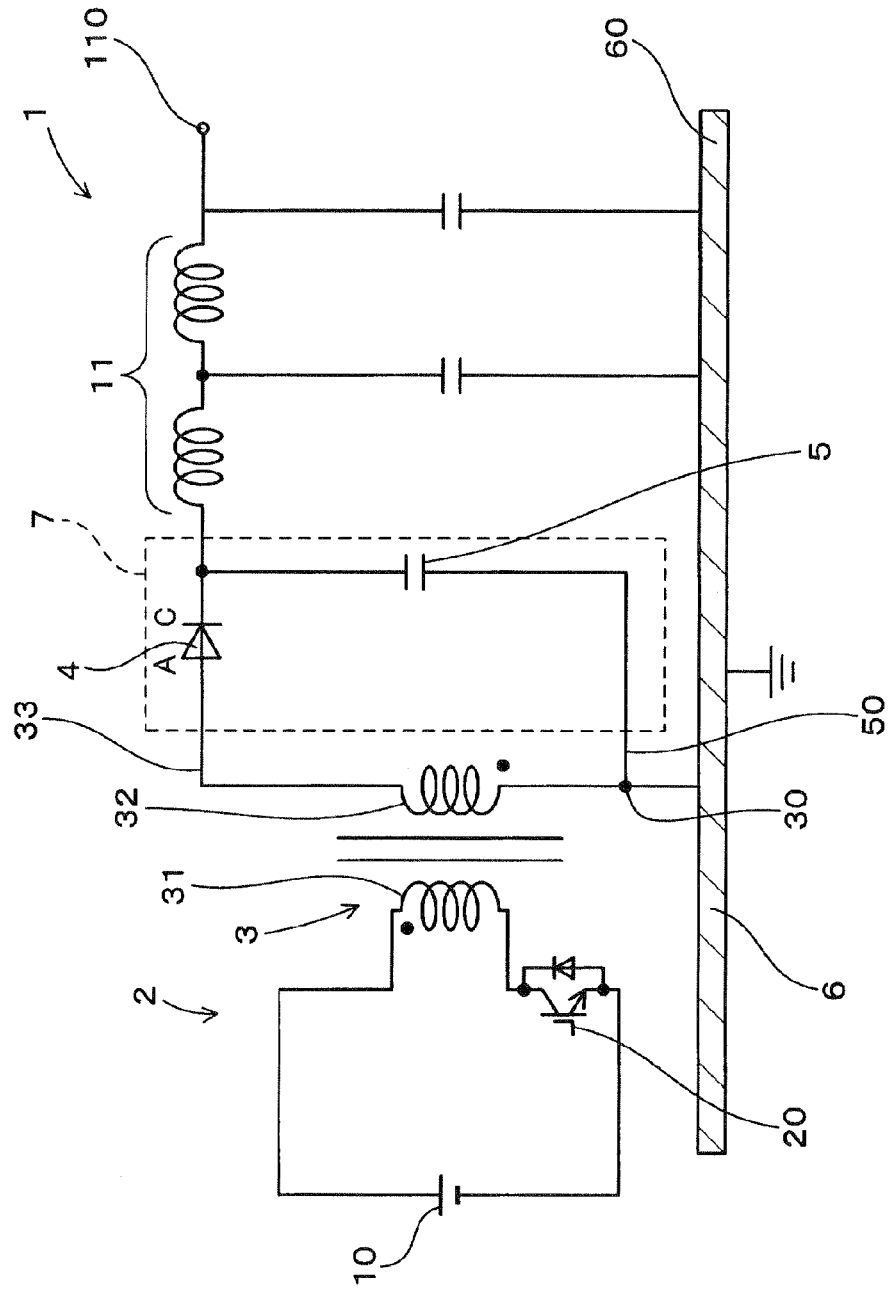
FIG. 11 shows a circuit diagram of the electric power converter in a fourth embodiment.

As shown in FIG. 11, the electric power converter 1 of the present embodiment is what is called a flyback converter.

The electric power converter 1 of the present embodiment has a single secondary coil 32 and a single rectifier 4.

The secondary coil 32 is connected to the anode A of the rectifier 4 through the rectifier connecting terminal 33.

Moreover, between the cathode C of the rectifier 4 and the terminal 30 for the coil of the secondary coil 32 is connected by the noise filtering element 5.

It is constituted that the secondary voltage of the secondary coils 32 is half-wave rectified by the rectifier 4 in the present embodiment.

Moreover, the single rectifier 4 and the single noise filtering element 5 are built in the single module 7 in the present embodiment.

The terminal 30 for the coil of the secondary coils 32 is grounded through the plate 6.

In the present embodiment, the terminal 30 for the coil and the terminal 50 for the filter are formed between the transformer 3 and the noise filtering element 5 like the first embodiment (refer to FIG. 1).

The rest of the composition, functions and effects are the same as those of the first embodiment.

Fifth Embodiment

The present embodiment is an example that has changed the number of the secondary coils 32.

Figure 12:
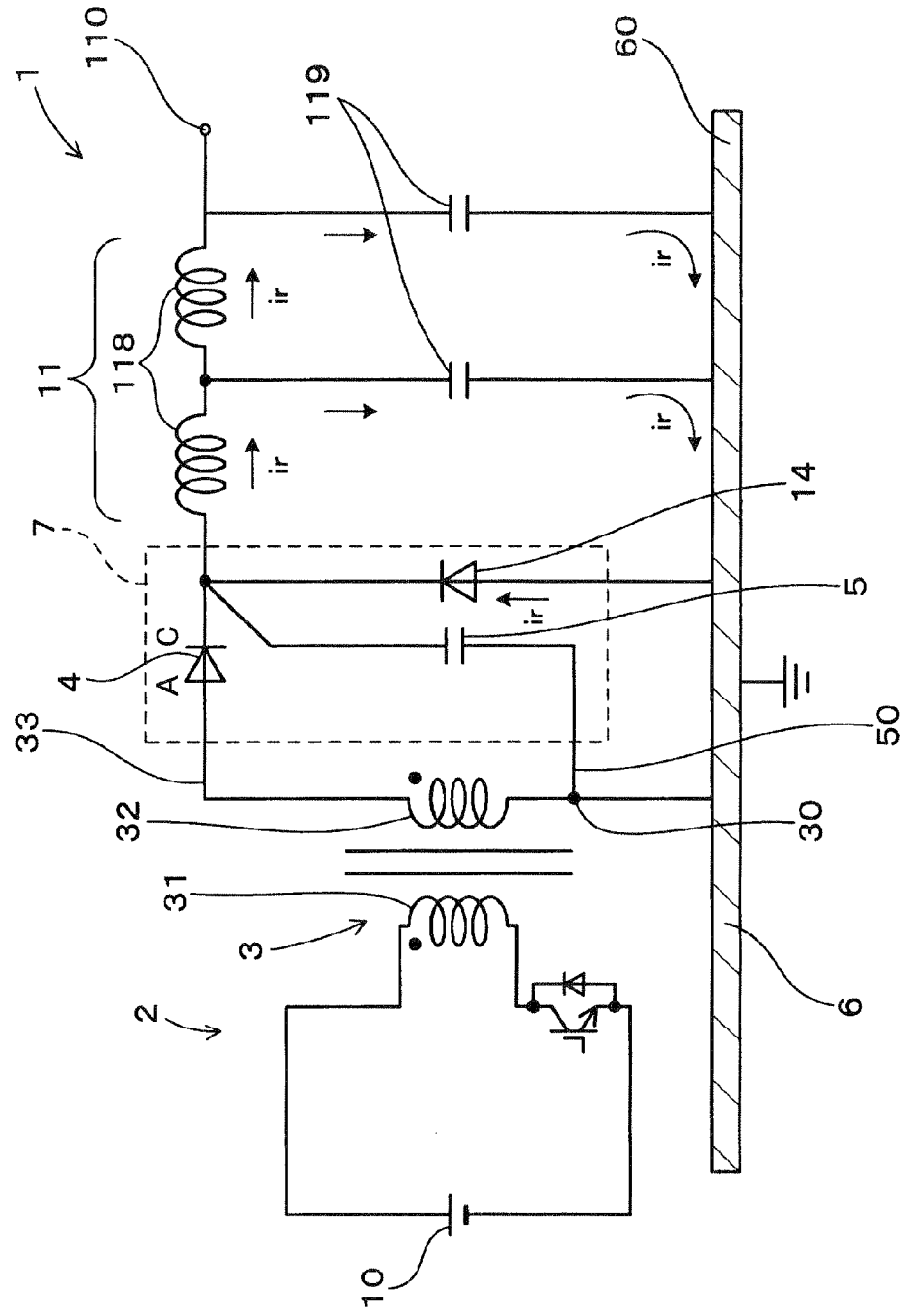
FIG. 12 shows a circuit diagram of the electric power converter in a fifth embodiment.

As shown in FIG. 12, the electric power converter 1 of the present embodiment is what is called a forward converter.

The electric power converter 1 of the present embodiment has a single secondary coil 32 and a single rectifier 4.

The secondary coil 32 is connected to the anode A of the rectifier 4 through the rectifier connecting terminal 33.

It is constituted that the secondary voltage of the secondary coils 32 is half-wave rectified by the rectifier 4.

Moreover, between the cathode C of the rectifier 4 and the terminal 30 for the coil of the secondary coil 32 is connected by the noise filtering element 5.

The terminal 30 for the coil is grounded through the plate 6.

Moreover, a flywheel diode 14 for sending a flywheel current it of the coils 118 is formed between the plate 6 and the cathode C of the rectifier 4.

In the present embodiment, the terminal 30 for the coil and the terminal 50 for the filter are formed between the transformer 3 and the noise filtering element 5 like the first embodiment (refer to FIG. 1).

Moreover, the rectifier 4, the flywheel diode 14, and the noise filtering element 5 are built in the single module 7.

The rest of the composition, functions and effects are the same as those of the first embodiment.

What is claimed is:

1. An electric power converter comprising:
a switching circuit section that is composed of switching elements;
a transformer that has a primary coil connected to the switching circuit section and a secondary coil;
a rectifier connected to the secondary coil of the transformer; and
a noise filtering element that allows a specific noise current to pass; wherein:
a closed circuit where the noise current flows is formed by the secondary coil, the rectifier, and the noise filtering element;
an LC filter circuit section electrically connected to a cathode of the rectifier;
the noise filtering element is a capacitor;
the transformer and the noise filtering element are disposed in a position next to each other;
the secondary coil and the noise filtering element are electrically connected to each other through a terminal for a coil that is a terminal of the secondary coil and a terminal for a filter that is a terminal of the noise filtering element;
the terminal for the coil and the terminal for the filter are disposed in a position between the transformer and the noise filtering element;
the noise filtering element is connected between (i) a connection point of the cathode of the rectifier and the LC filter circuit section and (ii) the terminal for the coil that is the terminal of the secondary coil;
the rectifier and the noise filtering element are built in a single module;
the rectifier and the noise filtering element are disposed on a single metal plate,
the module includes a main element body that has the rectifier and the noise filtering element therein, a terminal for rectification for connecting the rectifier to the secondary coil, and a terminal for a filter;
the terminal for rectification and the terminal for the filter are respectively projected towards the secondary coil from the main element body;
the terminal for the coil is projected towards the module;
a rectifier connecting terminal of the secondary coil is projected towards the module; and
the terminal for rectification of the module and the rectifier connecting terminal of the secondary coil are electrically connected.

2. The electric power converter according to claim 1, wherein,
the terminal for the coil and the terminal for the filter are connected directly.

3. The electric power converter according to claim 2, wherein,
the single metal plate, on which the rectifier and the noise filtering element are disposed, is configured for mounting the switching circuit section and the transformer;
the single metal plate is grounded; and
the terminal for the coil and the terminal for the filter are overlapped and fastened together on the single metal plate.

4. The electric power converter according to claim 1, wherein, the single metal plate, on which the rectifier and the noise filtering element are disposed, is configured for mounting the switching circuit section and the transformer; and the terminal for the coil and the terminal for the filter are connected to different positions on the single metal plate, respectively.

* * * * *